UNITED STATES PATENT OFFICE.

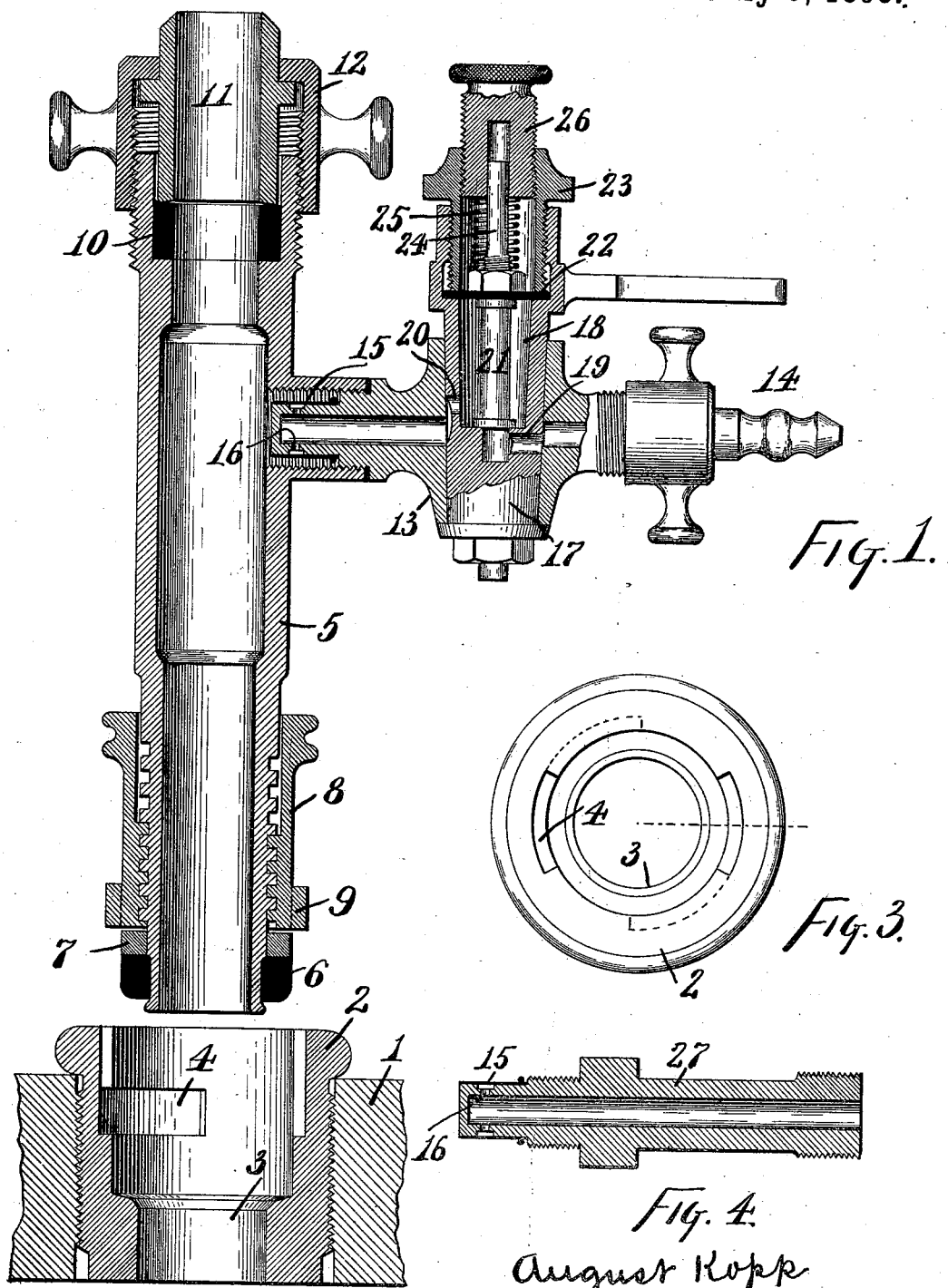

AUGUST KOPP, OF HAMILTON, OHIO, ASSIGNOR, BY MESNE ASSIGNMENTS, TO AUGUST KOPP, LEONHARD MILLER, AND PAUL TIECK, OF SAME PLACE.

APPARATUS FOR DRAWING BEER.

SPECIFICATION forming part of Letters Patent No. 542,364, dated July 9, 1895.

Application filed March 9, 1895. Serial No. 541,116. (No model.)

*To all whom it may concern:*

Be it known that I, AUGUST KOPP, of Hamilton, Butler county, Ohio, have invented certain new and useful Improvements in Apparatus for Drawing Beer, of which the following is a specification.

This invention pertains to apparatus for use in tapping kegs of beer, and will be readily understood from the following description, taken in connection with the accompanying drawings, in which—

Figure 5:
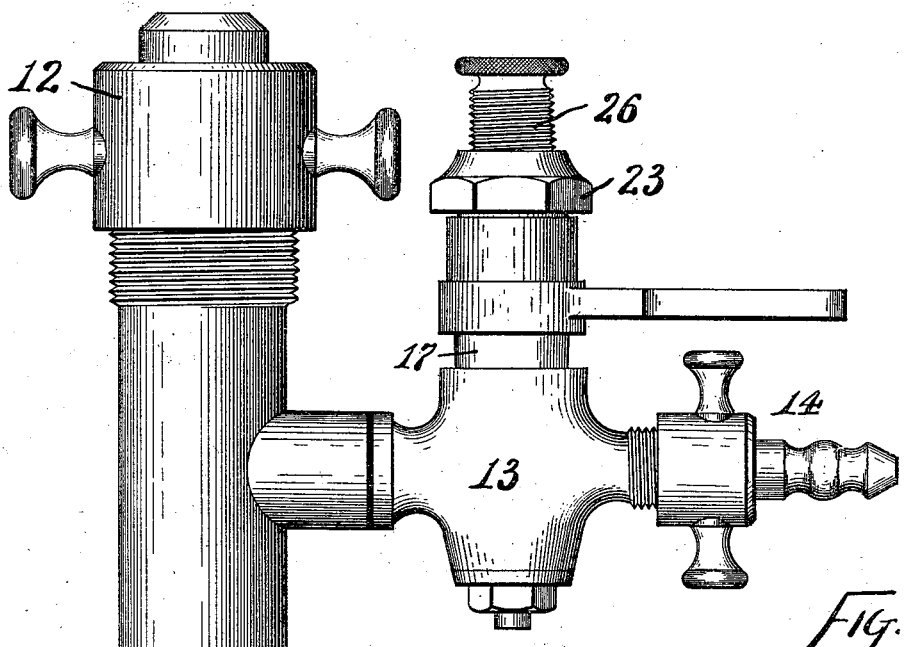
Figure 6:
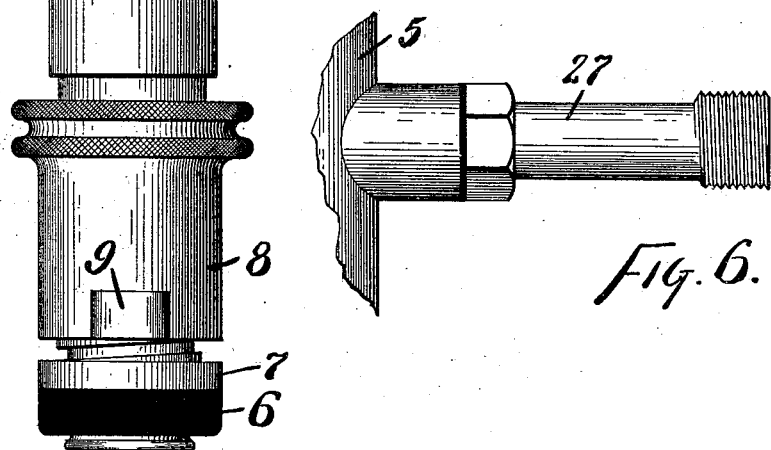

Figure 1 is a vertical diametrical section of an apparatus exemplifying my improvements, shown detached from but ready for insertion into a beer-keg; Fig. 2, a section through a portion of the head of a beer-keg, showing in section the bushing into which the apparatus is to be inserted; Fig. 3, a plan of the bushing; Fig. 4, a diametrical section of a modified form of air-branch; Fig. 5, a side elevation of the apparatus shown in Fig. 1, and Fig. 6 a side elevation of the modified air-branch shown in Fig. 4.

In the drawings, 1 indicates the head of a beer-keg; 2, a metallic bushing firmly screwed into a hole therein; 3, that portion of the bore of the bushing which is to receive the plug or cork employed in closing the keg after the keg is filled, the cork being inserted from the outside, as usual, and being adapted to be forced inwardly from the bushing at the time of tapping the keg, this seat for the cork being shallow, so that when the upper end of the cork is about flush with the top of the seat it will require to be driven inwardly a very short distance in order to free it from the bushing; 4, lock-notches in the bore of the bushing; 5, a sleeve having a bore through which the usual long shank of the beer-faucet or draft-pipe may be passed; 6, a gum packing-ring fast on the lower end of this sleeve and adapted when the sleeve is pushed down into the bushing 2 to bear against the upper surface or surrounding margin of the cork-seat 3, the periphery of this gum packing loosely fitting the bore of the bushing above the cork-seat; 7, a collar fast on the sleeve just over the gum packing 6; 8, a sleeve-nut threaded onto the sleeve 5 above the collar 7; 9, lock-lugs projecting from the lower portion of the periphery of sleeve-nut 8 and adapted for engagement with the notches 4, whereby a bayonet-joint is formed between the sleeve-nut 8 and the bushing 2; 10, a packing-ring located in a counterbore in the upper end of sleeve 5; 11, a gland over this packing-ring, and 12 a packing-nut screwed on the upper end of sleeve 5 and serving to force down the gland and compress the packing-ring and contract its inner periphery so as to closely fit the shank of the beer-faucet or draft-pipe which is to be used in connection with the apparatus.

The keg will be filled as usual and closed by a cork or plug forced into the seat 3, the upper end of the cork projecting but little, if any, above the seat 3. When the keg is to be tapped, the sleeve is inserted into the upper bore of the bushing, which it fits loosely, the lugs 9 engaging the notches 4 of the bushing, thus locking the parts to the bushing. This brings the packing-ring 6 against the top of seat 3. Sleeve 5 is now turned, causing the packing-ring 6 to be tightly compressed against the top of seat 3, thus forming a tight joint between sleeve 5 and the bushing, the extreme lower end of sleeve 5 at the same time making contact with the top of the cork and pushing it almost out of its seat in the bushing. In this operation the sleeve-nut 8 has served as a means for locking the apparatus to the keg and has furnished an abutment-nut for the compressive action which compresses the packing 6 and pushes upon the cork. The shank of the beer-faucet or the draft-pipe is then inserted longitudinally through the sleeve 5 till its lower end rests upon the cork. Packing-nut 12 is then tightened, thus making a tight joint at the top of sleeve 5 around the faucet or draft-pipe. A forcible pushing or tapping upon the faucet or draft-pipe then entirely displaces the cork from the bushing and permits the faucet or draft-pipe to be inserted as far as needed into the keg. When the keg is empty, the faucet or draft-pipe may be removed by first slacking the packing-nut 12. The entire apparatus may then be removed from the keg by first turning the sleeve 5, thus relieving the compression of packing-ring 6, after which the bayonet-joint is released by turning and withdrawing sleeve-nut 8. Sleeve 5 is also provided with a branch for admitting air on top of the beer from any suitable source of supply, and this matter will now be described, it being understood that when the beer-faucet or draft-pipe is in place in the sleeve it fits so loosely in the lower part of the sleeve that air entering the body of the sleeve around the faucet or draft-pipe may pass down into the keg.

Referring further to the drawings, and particularly to Fig. 1, 13 indicates an air-cock screwed into a boss projecting from the side of sleeve 5 and forming an air-inlet branch to the sleeve; 14, a coupling, permitting the air-pipe to be connected to this cock; 15, a thin flexible sleeve, as of rubber, encircling the nose of the air-cock where it enters the side boss of the sleeve, this rubber sleeve being secured to the nose at its end nearer the cock, as by a binding of wire or cord, the passage-way from the cock to the sleeve being closed at the end of the nose; 16, one or more holes through the wall of the nose of the cock, leading outwardly from the air-passage in the nose and having their outer ends closed by the rubber sleeve 15, the rubber sleeve thus forming a check-valve, which permits air under pressure to flow from the cock to sleeve 5 by expanding the rubber sleeve and blowing out at its end, while the hugging of the rubber sleeve to the nose of the cock prevents the movement of the air in the reverse direction; 17, the plug of the cock, having the usual taper fit; 18, a deep axial bore in the top of the plug of the cock, this bore reaching down to near the plane of the air-passage through the stationary part of the cock; 19, an air-passage leading diametrically part way through the cock-plug and then upwardly into the bore 18; 20, air-passage leading from bore 18 of the cock-plug to the passage in the cock-body, where it connects with the sleeve 5, it being understood that passages 19 and 20 are effective only when the cock is open, the cock being closed by turning the plug and bringing the cross-passages crosswise, as usual in plug-cocks; 21, a valve located in bore 18 and seating against the floor of that bore and closing passage 19; 22, a flexible disk, as of rubber, clamped to valve 21 and seating in a counterbore in the top of the cock-plug; 23, a gland screwed into this counterbore and clamping the periphery of disk 22 tightly to the cock-plug, whereby bore 18 is made air-tight at its top, and at the same time valve 21 is at liberty to rise and fall; 24, a stem forming an upward prolongation of valve 21; 25, a spring surrounding this stem and pressing the valve downwardly to its seat, and 26 an adjusting-screw threaded into gland 23 and bored to receive stem 24 and forming a top guide for the valve and forming an adjustable abutment for the spring, whereby the tension of the spring may be adjusted.

The cock-plug is provided with the usual handle by which it may be turned. The cock being closed and the air-pipe having been coupled to it, the plug may be turned to open the cock, whereupon the air under pressure passes into the keg. The tension of spring 25 may be regulated by screw 6, so as to offer a resistance to the passage of the air on its way to the keg, and this adjustment will not be disturbed by the opening or closing of the cock. The air-pressure entering the cock may thus be reduced to any desired point on its way to the keg.

The cock with its regulating-valve may, if desired, be omitted and the simpler air-branch 27 substituted for it, this air-branch having the same arrangement of coupling for the air-pipe, and the same arrangement of rubber sleeve 15 forming the check-valve.

I claim as my invention—

1. The combination of a bushing having a cork-seat and a notched counterbore above the same, a threaded sleeve having a packing box at its upper end and a collar fast near its lower end, a packing ring upon the lower end of said sleeve under said collar and adapted to be compressed facially against the floor of the counterbore in said bushing, and a sleeve nut threaded on said sleeve above said collar and having lugs adapted to engage the notches in said bushing, substantially as and for the purpose set forth.

2. The combination of a bushing having a cork-seat and a notched counterbore above the same, a threaded sleeve having a packing box at its upper end and having a collar fast near its lower end, a packing ring surrounding the lower end of said sleeve below said collar and adapted to make facial contact with the floor of the counterbore in said bushing when the end of said sleeve projects below said floor into the cork-seat of the bushing, and a sleeve-nut threaded upon said sleeve above said collar and having lugs adapted to engage the notches of said bushing, substantially as and for the purpose set forth.

3. The combination of a sleeve adapted for detachable connection with a beer keg and having an air branch, a plug cock disposed in said air branch and having its plug axially bored from the top and provided with a cross-air passage, a valve disposed in the bore of said plug and serving to close the air passage across the plug, a flexible disk with its center secured to said valve and with its periphery clamped to the wall of the bore of the plug, and a spring disposed within the plug and holding said valve yieldingly to closed position, substantially as and for the purpose set forth.

4. The combination of a sleeve adapted for detachable connection with a beer keg and having an air branch, a plug cock disposed in said air branch and having its plug axially bored from the top and provided with a cross-air passage, a valve disposed in the bore of said plug and serving to close the air passage across the plug, a flexible disk with its center clamped to said valve and its periphery seating in a counterbore in said plug, a gland screwed into the counterbore of the plug and clamping the periphery of said disk, an adjusting screw in the top of said gland, and a spring within said gland and under said adjusting screw and above said disk and serving to hold said valve yieldingly to closed position, substantially as and for the purpose set forth.

AUGUST KOPP.

Witnesses:
J. W. SEE,
LEONHART MILLAR.